United States Patent
Vila

(10) Patent No.: US 12,158,226 B2
(45) Date of Patent: Dec. 3, 2024

(54) FLEXIBLE ALIGNMENT SEALING COUPLING

(71) Applicant: Roller Bearing Company of America, Inc., Oxford, CT (US)

(72) Inventor: Smail Vila, Louisville, KY (US)

(73) Assignee: Roller Bearing Company of America, Inc., Oxford, CT (US)

( * ) Notice: Subject to any disclaimer, the term of this patent is extended or adjusted under 35 U.S.C. 154(b) by 514 days.

(21) Appl. No.: 17/319,721

(22) Filed: May 13, 2021

(65) Prior Publication Data

US 2021/0356062 A1    Nov. 18, 2021

Related U.S. Application Data

(60) Provisional application No. 63/025,505, filed on May 15, 2020.

(51) Int. Cl.
    *F16L 27/113*    (2006.01)
    *F16J 15/34*    (2006.01)
    *F16L 27/10*    (2006.01)

(52) U.S. Cl.
    CPC ....... *F16L 27/1021* (2013.01); *F16J 15/3448* (2013.01); *F16L 27/1012* (2013.01); *F16L 27/113* (2013.01)

(58) Field of Classification Search
    CPC .... F16J 15/06; F16L 27/1017; F16L 27/1021; F16L 27/113
    See application file for complete search history.

(56) References Cited

U.S. PATENT DOCUMENTS

| 2,538,683 A | * | 1/1951 | Guiler | F16L 27/113 |
| | | | | 285/379 |
| 3,712,647 A | * | 1/1973 | Stecher | F16J 15/127 |
| | | | | 285/341 |

(Continued)

FOREIGN PATENT DOCUMENTS

| DE | 2142219 A1 | * | 3/1972 | |
| DE | 102011013184 A1 | * | 9/2012 | F02M 26/12 |

(Continued)

OTHER PUBLICATIONS

Extended European Search Report issued in corresponding EP Application No. 21173858.8, dated Sep. 27, 2021, pp. 1-5.

*Primary Examiner* — Zachary T Dragicevich
*Assistant Examiner* — James A Linford
(74) *Attorney, Agent, or Firm* — Ruggiero McAllister & McMahon LLC

(57) ABSTRACT

A seal for a flexible alignment sealing coupling. The seal includes an annular member being symmetric about a longitudinal axis. The annular member has a radially inward facing surface extending an axial width between a first axial end and a second axial end. In a relaxed state of the seal, the radially inward facing surface has an asymmetric generally concave V-shaped cross section and is defined by a first section and a second section. The first section has a first seal taper angle measured relative to a line parallel to the longitudinal axis. The second section has a second seal taper angle measured relative to another line parallel to the longitudinal axis. The first seal taper angle is less than the second seal taper angle. Each of the first seal taper angle and the second seal taper angle is greater than zero degrees and less than 90 degrees.

35 Claims, 11 Drawing Sheets

(56) References Cited

U.S. PATENT DOCUMENTS

| | | | |
|---|---|---|---|
| 4,427,220 A | 1/1984 | Decker | |
| 4,577,874 A | 3/1986 | Zitting | |
| 4,819,952 A * | 4/1989 | Edlund | F16J 15/3232 |
| | | | 277/556 |
| 4,964,764 A | 10/1990 | Perrotto | |
| 5,092,610 A | 3/1992 | Dunham et al. | |
| 5,106,129 A | 4/1992 | Camacho et al. | |
| 5,149,107 A | 9/1992 | Maringer et al. | |
| 5,505,498 A | 4/1996 | Halling et al. | |
| 6,179,339 B1 | 1/2001 | Vila | |
| 6,416,058 B1 | 7/2002 | Zygmunt | |
| 6,709,024 B1 * | 3/2004 | Swinford | F16L 27/026 |
| | | | 285/369 |
| 6,880,863 B2 | 4/2005 | Vila | |
| 6,883,804 B2 | 4/2005 | Cobb | |
| 6,905,144 B2 | 6/2005 | Vila | |
| 7,111,821 B2 | 9/2006 | Promper | |
| 7,810,208 B2 | 10/2010 | Geelhoed | |
| 7,883,094 B2 | 2/2011 | Vila | |
| 8,328,202 B2 | 12/2012 | Foster et al. | |
| 8,360,477 B2 * | 1/2013 | Flynn | F16L 37/088 |
| | | | 285/302 |
| 9,234,591 B2 | 1/2016 | Dilmaghanian et al. | |
| 9,285,034 B2 | 3/2016 | Balsells et al. | |
| 9,534,699 B2 | 1/2017 | Brown | |
| 10,052,748 B2 * | 8/2018 | Escolle | F16J 9/20 |
| 10,117,366 B2 | 10/2018 | Dilmaghanian et al. | |
| 10,520,091 B2 | 12/2019 | Niknezhad | |
| 2005/0001423 A1 | 1/2005 | Vila | |
| 2009/0079186 A1 | 3/2009 | Frost et al. | |
| 2015/0267752 A1 * | 9/2015 | Navarro | F16J 15/3208 |
| | | | 277/589 |
| 2018/0119857 A1 | 5/2018 | Balsells | |
| 2019/0219172 A1 | 7/2019 | Emig et al. | |
| 2020/0199279 A1 | 6/2020 | Gopalan et al. | |
| 2020/0347970 A1 | 11/2020 | Vila et al. | |
| 2023/0407968 A1 * | 12/2023 | Prandoni Kistner | F16J 15/104 |

FOREIGN PATENT DOCUMENTS

| | | | | |
|---|---|---|---|---|
| DE | 102014000465 A1 * | 7/2015 | | F02M 35/10091 |
| DE | 102019102934 A1 * | 8/2020 | | F16L 21/005 |
| EP | 1201983 A2 | 5/2002 | | |
| EP | 1323958 B1 | 8/2007 | | |
| EP | 2589842 A1 | 5/2013 | | |
| EP | 2554877 B1 | 9/2016 | | |
| EP | 3217046 A1 | 9/2017 | | |
| EP | 3734132 A1 | 11/2020 | | |
| FR | 2586270 A1 * | 2/1987 | | |
| FR | 2934027 A1 * | 1/2010 | | F16L 25/12 |
| GB | 1139773 | 1/1969 | | |
| WO | 0063540 | 10/2000 | | |
| WO | 2013034148 A3 | 3/2013 | | |

* cited by examiner

FLEXIBLE ALIGNMENT SEALING COUPLING

CROSS-REFERENCE TO RELATED APPLICATIONS

The present application is a non-provisional application of, and claims priority benefit to, commonly owned and U.S. Provisional Patent Application No. 63/025,505 filed on May 15, 2020, the contents of which are incorporated herein by reference in its entirety.

TECHNICAL FIELD

The present invention is directed to flexible alignment seal couplings for joining duct assemblies and subassemblies to one another while allowing sealing movement to compensate for structural kinematics and dynamic loads, and the present invention is specifically directed to low temperature/low pressure pneumatic systems that operate at a maximum temperature of 600° F. and a maximum pressure of 200 PSI.

BACKGROUND

Prior art OEM engines and aircraft pneumatic systems utilize bellows and/or couplings built as combinations of bellows and carbon seal based couplings. Such designs do not provide resistance to system dynamic loads thereby causing premature failures. Moreover, bellows couplings are limited in response to dynamic lateral and offset articulations and are limited for twisting articulation exhibiting cracks when exposed to combined dynamic loads, vibrations and articulations. Carbon based seals in those couplings crumble under dynamic loads and vibrations causing cracks or premature and excessive wear that freezes the couplings and overload the system causing restrains fatigue and cracking which can, in extreme cases, cause ducts cracks and deformations. Thus, bellows couplings can fatigue and fail catastrophically causing excessive system leaks and pressure to drop significantly under allowable limits. Bellows couplings also cannot yield axial torque, which is transferred through the systems as additional torsion loads.

A problem with existing flexible coupling designs is that under operating conditions bellows or carbon rings or sleeves based couplings are readily subject to cracking and breakage with mechanical vibrations of the coupling. The carbon seals or sleeves based couplings premature failures are more frequent while longer lasting bellows will, when they fail, cause catastrophic failure. In order to repair systems the bellows must be removed and replaced with a new unit, while carbon ring or sleeve replacement also requires the coupling removal. In both cases, cutting of the failed unit and re-welding of the new or repaired unit requires special and suitably equipped shops and certified repair facilities.

As a result, there exists a need in the art for a sealed flexible alignment coupling containing seal rings capable of withstanding long-term exposure to mechanical and thermal stresses and vibrations without cracking, fatigue or breakage, and to have sealed flexible alignment couplings which can be taken apart at the site and replace seal rings using standard shop tools and techniques to eliminate the need to remove the coupling from its attached conduit to be sent to a remote certified repair station.

SUMMARY

There is disclosed herein a seal for a flexible alignment sealing coupling. The seal includes an annular member that is symmetric about a longitudinal axis. The annular member has a radially inward facing surface that extends an axial width between a first axial end and a second axial end. In a relaxed state of the seal, the radially inward facing surface has an asymmetric generally concave V-shaped cross section and is defined by a first section and a second section. The first section has a first seal taper angle, measured relative to a first line parallel to the longitudinal axis, and the second section has a second seal taper angle, measured relative to a second line parallel to the longitudinal axis. The first seal taper angle is less than the second seal taper angle. Each of the first seal taper angle and the second seal taper angle is greater than zero degrees and less than 90 degrees.

In one embodiment, the first section is sloped from a first point to a second point that is radially outward of and axially inward from the first point. The second section is sloped from a third point to a fourth point that is radially outward of and axially inward from the third point. The second point and the fourth point are located axially between the first point and the third point.

In one embodiment, the first seal taper angle is about 10 degrees.

In one embodiment, the second seal taper angle is about 60 degrees.

In one embodiment, the seal has an undercut groove located at a juncture of the first section and the second section and positioned a distance of about 55 percent to about 65 percent of the axial width of the annular member, measured from the first axial end.

In one embodiment, the seal has an undercut groove located at a juncture of the first section and the second section and positioned a distance of about 45 percent to about 55 percent of a radial thickness of the annular member, measured from an outermost portion of an exterior surface of the annular member to a radially innermost surface of the annular member.

In one embodiment, the seal includes a first lobe located between the first axial end and the undercut groove. The first lobe extends radially inward from the first section. The seal includes a second lobe located between the second axial end and the undercut groove. The second lobe extends radially inward from the second section.

In one embodiment, the second lobe extends radially inward to a greater extent than does the first lobe.

In one embodiment, the second lobe extends radially inward a distance which is about 45 percent to about 55 percent of an overall radial thickness of the annular member.

In one embodiment, the first axial end of the annular member has a first outside diameter and a first inside diameter defining an annulus with a first cross sectional area perpendicular to the longitudinal axis. The second axial end of the annular member has a second outside diameter and a second inside diameter defining an annulus with a second cross sectional area perpendicular to the longitudinal axis. The first cross sectional area is 105 percent to 115 percent of the second cross sectional area.

In one embodiment, the annular member has a maximum outside diameter at a first outside diameter and a minimum inside diameter at a second inside diameter. A radial thickness is defined by the maximum outside diameter and the minimum inside diameter.

In one embodiment, the annular member is a circumferentially continuous ring that expands radially and axially.

There is also disclosed herein a ring holder for a flexible alignment sealing coupling. The ring holder includes a tubular body that is symmetrical about a longitudinal axis. The ring holder has a first radially outward opening first groove. The first groove has a first outboard wall and a first inboard wall that each extend circumferentially around the tubular body, and a concave asymmetrical first V-shaped surface that extends between the first outboard wall and the first inboard wall. The first V-shaped surface is defined by a first groove-segment sloped at a first outboard taper angle, measured relative to a first line parallel to the longitudinal axis, and a second groove-segment sloped at a first inboard taper angle, measured relative to a second line parallel to the longitudinal axis.

In one embodiment, the first outboard taper angle is about 40 degrees.

In one embodiment the first inboard taper angle is about 10 degrees.

In one embodiment, the first outboard wall has a first outside diameter and the first inboard wall has a second outside diameter that is greater than the first outside diameter.

In one embodiment, the second outside diameter is 108 percent to 112 percent of the first outside diameter.

In one embodiment, the tubular body has a body interior surface that has a chamfer formed opposite the first groove-segment.

In one embodiment, the chamfer is parallel to the first groove-segment.

In one embodiment, the first V-shaped surface causes a biasing member seated therein to impart a force on a seal disposed in the first groove. The force has a direction that is comprised of about a 60 percent radial component and about a 40 percent axial component.

In one embodiment, the seal includes an annular member that is symmetric about the longitudinal axis. The annular member has a radially inward facing surface that extends an axial width between a first axial end and a second axial end. In a relaxed state of the seal, the radially inward facing surface has an asymmetric generally concave V-shaped cross section and is defined by a first section and a second section. The first section has a first seal taper angle, measured relative to a third line parallel to the longitudinal axis, and the second section has a second seal taper angle, measured relative to a fourth line parallel to the longitudinal axis. The first seal taper angle is less than the second seal taper angle. Each of the first seal taper angle and the second seal taper angle is greater than zero degrees and less than 90 degrees.

In one embodiment, the ring holder includes a radially outward facing second groove. The second groove has a second outboard wall and a second inboard wall that each extend circumferentially around the tubular body, and a concave asymmetrical second V-shaped surface that extends between the second outboard wall and the second inboard wall. The second V-shaped surface is defined by a third groove-segment sloped at a second outboard taper angle, measured relative to a third line parallel to the longitudinal axis, and a fourth groove-segment sloped at a second inboard taper angle, measured relative to a fourth line parallel to the longitudinal axis.

In one embodiment, the ring holder includes a cylindrical tube segment that extends between the first groove and the second groove.

There is also disclosed herein a flexible alignment sealing coupling. The flexible alignment sealing coupling includes a first sleeve that has a first inner sealing surface that extends circumferentially therein. A radially outward opening first groove of a ring holder is disposed inside the first sleeve. The ring holder includes a tubular body that is symmetrical about a longitudinal axis. The ring holder has the first radially outward opening first groove formed thereon. The first groove has a first outboard wall and a first inboard wall that each extend circumferentially around the tubular body, and a concave asymmetrical first V-shaped surface that extends between the first outboard wall and the first inboard wall. The first V-shaped surface is defined by a first groove-segment sloped at a first outboard taper angle, measured relative to a first line parallel to the longitudinal axis, and a second groove-segment sloped at a first inboard taper angle, measured relative to a second line parallel to the longitudinal axis. A first biasing member is disposed in the first groove and is seated on the first V-shaped surface. A first seal is disposed in the first groove. The first seal includes a first annular member that is symmetric about the longitudinal axis. The first annular member has a first radially inward facing surface that extends a first axial width between a first axial end and a second axial end of the first annular member. In a relaxed state of the first seal, the first radially inward facing surface has an asymmetric generally concave V-shaped cross section and is defined by a first section and a second section. The first section has a first seal taper angle, measured relative to a third line parallel to the longitudinal axis, and the second section has a second seal taper angle, measured relative to a fourth line parallel to the longitudinal axis. The first seal taper angle is less than the second seal taper angle. Each of the first seal taper angle and the second seal taper angle is greater than zero degrees and less than 90 degrees. The first seal is disposed in the first groove with the first radially inward facing surface of the first seal seated on the first biasing member. An exterior surface of the first seal is in sliding sealing engagement with the first inner sealing surface of the first sleeve.

In one embodiment, the flexible alignment coupling includes a second sleeve that has a second inner sealing surface that extends circumferentially therein. A radially outward opening second groove of the ring holder is disposed inside the second sleeve. The second groove has a second outboard wall and a second inboard wall that each extend circumferentially around the tubular body, and a concave asymmetrical second V-shaped surface that extends between the second outboard wall and the second inboard wall. The second V-shaped surface is defined by a third groove-segment sloped at a second outboard taper angle, measured relative to a fifth line parallel to the longitudinal axis, and a fourth groove-segment sloped at a second inboard taper angle, measured relative to a sixth line parallel to the longitudinal axis. A second biasing member is disposed in the second groove and is seated on the second V-shaped surface. A second seal is disposed in the second groove. The second seal includes a second annular member that is symmetric about the longitudinal axis. The second annular member has a second radially inward facing surface that extends a second axial width between a first axial end and a second axial end of the second annular member. In a relaxed state of the second seal, the second radially inward facing surface has an asymmetric generally concave V-shaped cross section and is defined by a third section and a fourth section. The third section has a third seal taper angle, measured relative to a seventh line parallel to the longitudinal axis, and the fourth section has a fourth seal taper angle, measured relative to an eighth line parallel to the longitudinal axis. The third seal taper angle is less than the fourth seal taper angle. Each of the third seal taper angle and the fourth seal taper angle is greater than zero degrees and less than 90 degrees. The second seal is disposed in the second groove with the second radially inward facing surface of the second seal seated on the second biasing member. An exterior surface of the second seal is in sliding sealing engagement with the second inner sealing surface of the second sleeve. The first sleeve and the second sleeve allow axial, conical and radial movement relative to each other.

In one embodiment, the first V-shaped surface of the ring holder causes the first biasing member to impart a first force on the first seal that reacts against the first inner sealing surface. The first force has a direction that is comprised of about a 60 percent radial component and about a 40 percent axial component. The second V-shaped surface of the ring holder causes the second biasing member to impart a second force on the second seal that reacts against the second inner sealing surface. The second force has a direction that is comprised of about a 60 percent radial component and about a 40 percent axial component.

In one embodiment, the first sleeve and/or the second sleeve has an inward conical taper that reduces pressure losses through the flexible alignment coupling.

In one embodiment, the first sleeve is secured to a first conduit and the second sleeve is secured to a second conduit. The first seal and/or the second seal is installable and removable in situ.

In one embodiment, the first sleeve has a first radially inward opening retaining groove that extends circumferentially therearound. The second sleeve has a second radially inward opening retaining groove that extends circumferentially therearound. A first retaining ring is disposed in the first retaining groove and a second retaining ring is disposed in the second retaining groove.

In one embodiment, the third groove-segment and the fourth groove-segment intersect at a valley. The second inboard wall extends a first distance radially outward relative to a reference line that intersects the valley and is parallel to the longitudinal axis. The second seal has a lobe that extends radially inward from the third section. The lobe has an edge radial thickness. The first distance is greater than or equal to 1.6 times the edge radial thickness.

In one embodiment, the edge radial thickness is less than a first height of the second biasing member when the second biasing member is compressed in the second V-shaped surface to 80 percent to 85 percent of a free state height of the second biasing member.

In one embodiment, the first seal includes a lobe that extends radially inward from the second section. The first seal is positioned in the first groove such that the lobe engages the first inboard wall.

In one embodiment, when in a dynamic mode with a fluid flowing through the first sleeve, the ring holder, and the second sleeve, a fluid pressure acts on the first radially inward facing surface of the first seal, the second radially inward facing surface of the second seal, the first inner sealing surface of the first sleeve, the body interior surface of the tubular body, the second inner sealing surface of the second sleeve, the first V-shaped surface of the first groove, and the second V-shaped surface of the second groove.

In one embodiment, 85 percent of a force generated by the fluid pressure on the first and second grooves acts on the first and second V-shaped surfaces, and 15 percent of the force generated by the fluid pressure on the first and second grooves acts on a first backside of the first outboard wall and a second backside of the second outward wall.

In one embodiment, 75 percent of a force generated by the fluid pressure on the first and second seals acts on the first section of the first seal and the third section of the second seal, and 25 percent of the force generated by the fluid pressure on the first and second seals acts on the second section of the first seal and the fourth section of the second seal.

DETAILED DESCRIPTION

Figure 1:
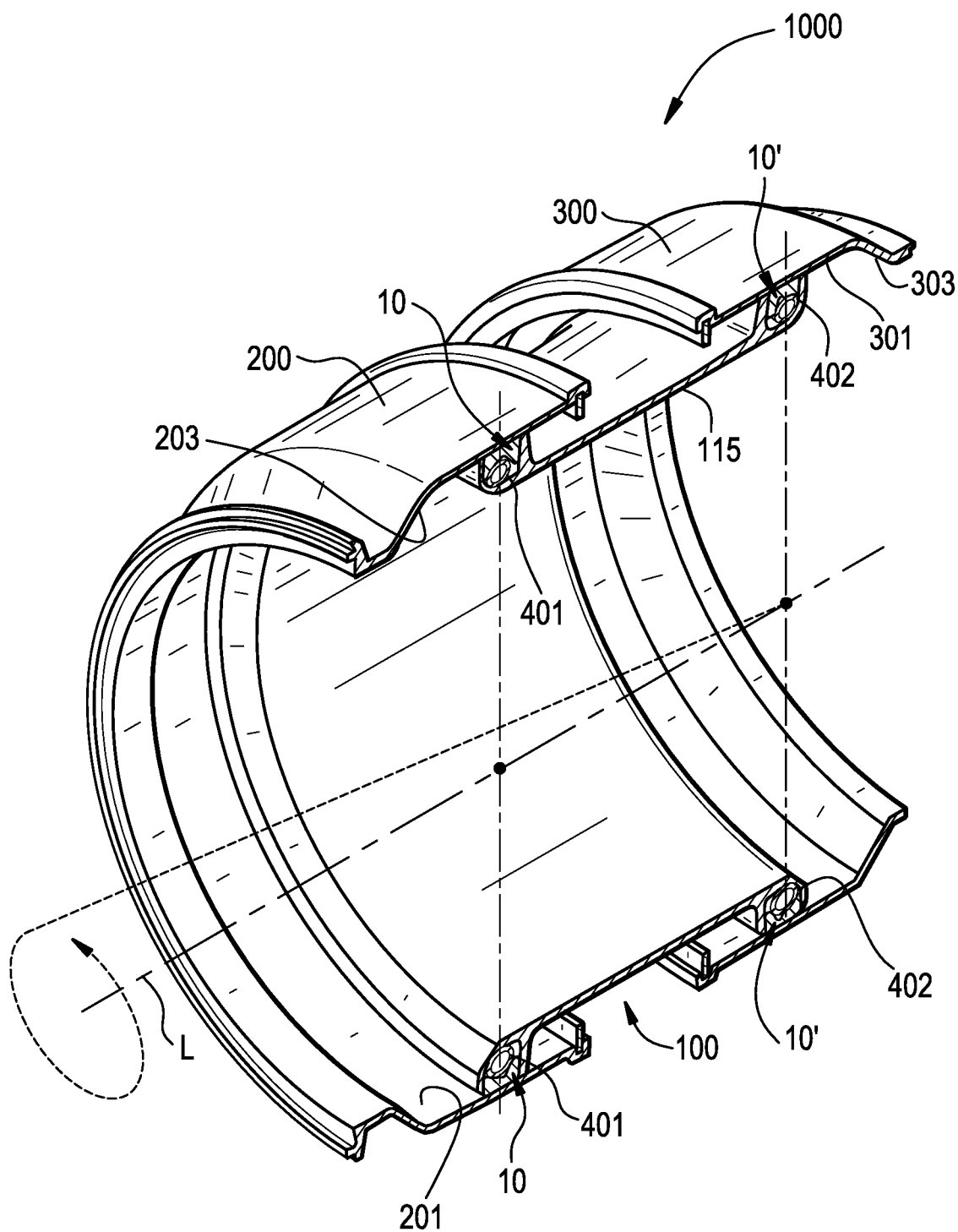
FIG. 1 is an isometric sectional view of a flexible alignment sealing coupling according to the present disclosure.
Figure 2:
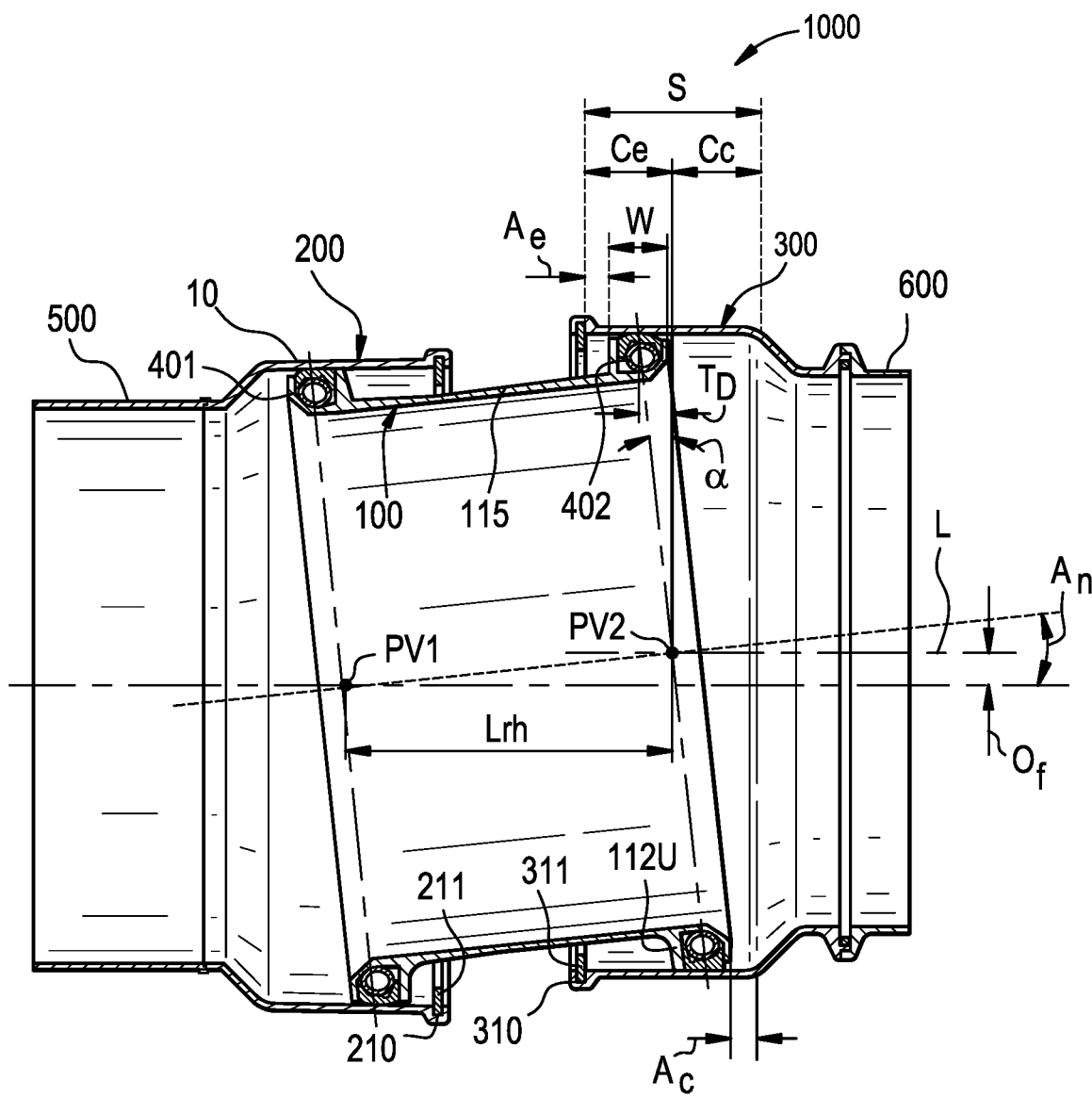
FIG. 2 is a side sectional view of the flexible alignment sealing coupling of FIG. 1.

As shown in FIGS. 1 and 2 a flexible alignment sealing coupling 1000 has two seals designated by reference numerals 10, 10'.

Figure 3A:
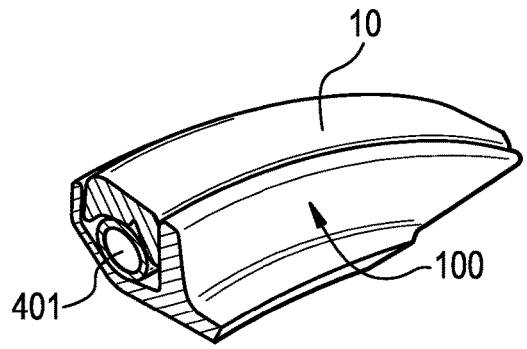
FIG. 3A is an isometric sectional view of a portion of a seal ring, a spring and a ring holder of the flexible alignment sealing coupling of FIG. 1.
Figure 3B:
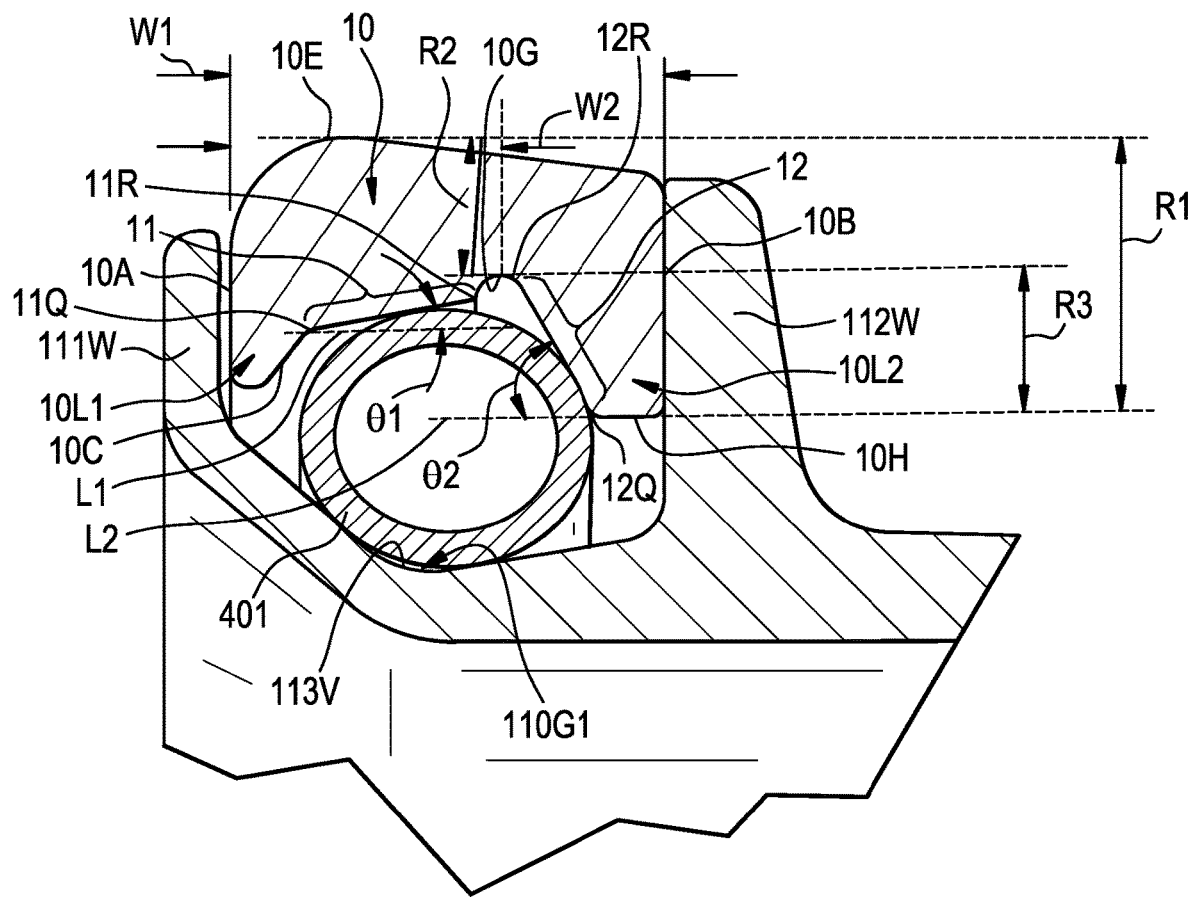
FIG. 3B is a partial side sectional view of the seal ring, spring and the ring holder of FIG. 3A.

Referring to FIGS. 1 and 2, a first seal 10 of a flexible alignment sealing coupling 1000 is disposed between a first sleeve 200 and a ring holder 100. The first sleeve 200 has a first inner sealing surface 201 extending circumferentially therein. Referring to FIG. 3B, a first groove 110G1 of the ring holder 100 is disposed inside the first sleeve 200. A first biasing member 401 is disposed in the first groove 110G1 and seated on a V-shaped surface 113V. The first seal 10 is disposed in the first groove 110G1 with radially inward facing surfaces 11, 12 of the first seal 10 seated on the first biasing member 401. An exterior surface 10E of the first seal is in sliding sealing engagement with the first inner sealing surface 201 of the first sleeve 200 (as depicted in FIG. 1). The second seal 10' has matching features to the first seal 10 but flipped over an axis perpendicular to the longitudinal axis L (i.e. the second seal 10' is a mirrored copy of the first seal 10), as shown in FIGS. 1, 2, 3E, 3F, and 7B. Thus, the following descriptions of the features of the first seal 10 are equally applicable to the features of the second seal 10', and vice versa.

Referring to FIGS. 1 and 2, the flexible alignment coupling 1000 includes a second sleeve 300 having a second inner sealing surface 301 extending circumferentially therein. A second groove 110G2 of the ring holder 100 is disposed inside the second sleeve 300. A second biasing member 402 is disposed in the second groove 110G2 and is seated on the concave asymmetrical V-shaped surface 113V'. A second seal 10' is disposed in the second groove 112G2. The radially inward facing surfaces 11', 12' of the second seal 10' are seated on the second biasing member 402. The exterior surface 10E' of the second seal 10' is in sliding sealing engagement with the second inner sealing surface 301 of the second sleeve 300. Referring to FIG. 2, the first sleeve 200 has a first radially inward opening retaining groove 210 extending circumferentially therearound and the second sleeve 300 has a second radially inward opening retaining groove 310 extending circumferentially therearound. A first retaining ring 211 is disposed in the first retaining groove 210 and a second retaining ring 311 is disposed in the second retaining groove 310. The first sleeve 200 and the second sleeve 300 are configured for axial, conical and radial movement relative to each other.

Figure 3C:
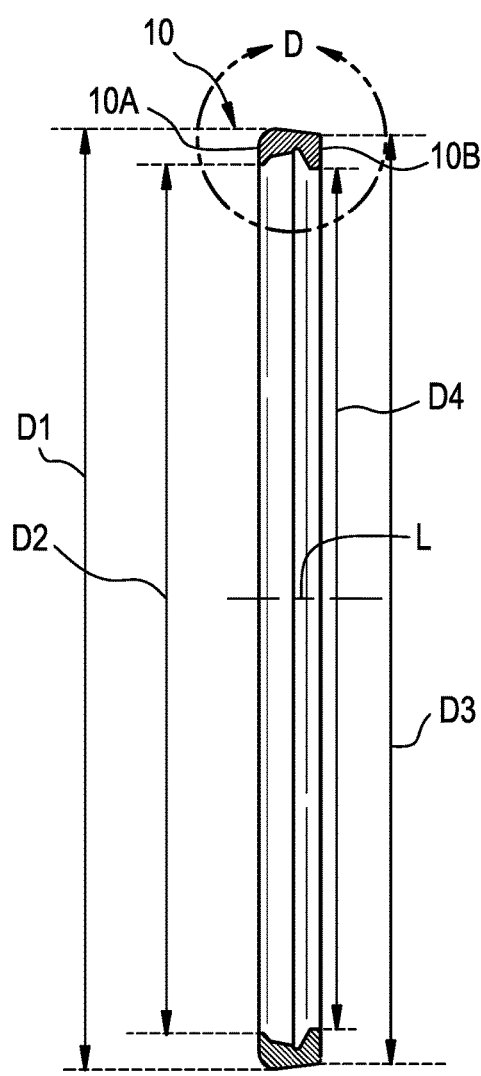
FIG. 3C is a side sectional view of a seal ring compatible with the flexible alignment sealing coupling of FIG. 1.

Referring to FIG. 3B, the first seal 10 has an annular member that is symmetrical about a longitudinal axis L (as depicted in FIGS. 1 and 2). The annular member is a circumferentially continuous ring that is configured to expand radially and axially. The annular member has a radially inward facing surface 10C extending an axial width W1 between a first axial end 10A and a second axial end 10B of the first seal 10. In a relaxed state of the first seal 10, the radially inward facing surface 10C has a generally concave asymmetric V-shaped cross section defined by a first section 11 and a second section 12. The first section 11 has a first seal taper angle θ1, measured relative to a first line L1 that is parallel to the longitudinal axis L, and the second section 12 has a second seal taper angle θ2, measured relative to a second line L2 that is parallel to the longitudinal axis L. As shown in FIG. 3F, the first section 11' of the second seal 10' has the first seal taper angle θ1, measured relative to a third line L3 that is parallel to the longitudinal axis L, and the second section 12' of the second seal 10' has the second seal taper angle θ2, measured relative to a fourth line L4 that is parallel to the longitudinal axis L.

Referring to FIG. 3B, the first section 11 of the first seal 10 is sloped from a first point 11Q to a second point 11R that is radially outward of and axially inward from the first point 11Q. The second section 12 of the first seal 10 is sloped from a third point 12Q to a fourth point 12R that is radially outward of and axially inward from the third point. The second point 11R and the fourth point 12R are located axially between the first point 11Q and the third point 12Q. An undercut groove 10G is located at the juncture of the first section 11 and the second section 12. The undercut groove 10G is positioned an axial distance W2 from the first axial end 10A and is positioned a radial distance R2 from the exterior surface 10E of the annular member. A first lobe 10L1 is located between the first axial end 10A and the undercut groove 10G. The first lobe 10L1 extends radially inward from the first section 11. A second lobe 10L2 is located between the second axial end 10B and the undercut groove. The second lobe 10L2 extends radially inward from the second section 12. The first seal 10 is positioned in the first groove 110G1 such that the second lobe 10L2 engages an inboard wall 112W of the ring holder 100.

In the embodiment depicted in FIGS. 3B, 3C, 3D, 3E, and 3F, the second lobe 10L2, 10L2' extends radially inward to a greater extent than does the first lobe 10L1, 10L1'. The radial distance R2 is about 45 percent to about 55 percent of a total radial thickness R1 of the annular member. As shown in FIG. 3B, the radial thickness R1 is measured from an outermost portion of the exterior surface 10E of the annular member to a radially innermost surface 10H of the annular member. The first seal taper angle θ1 is less than the second seal taper angle θ2. The distanced W2 is about 55 percent to about 65 percent of the axial width W1 of the annular member.

Figure 3D:
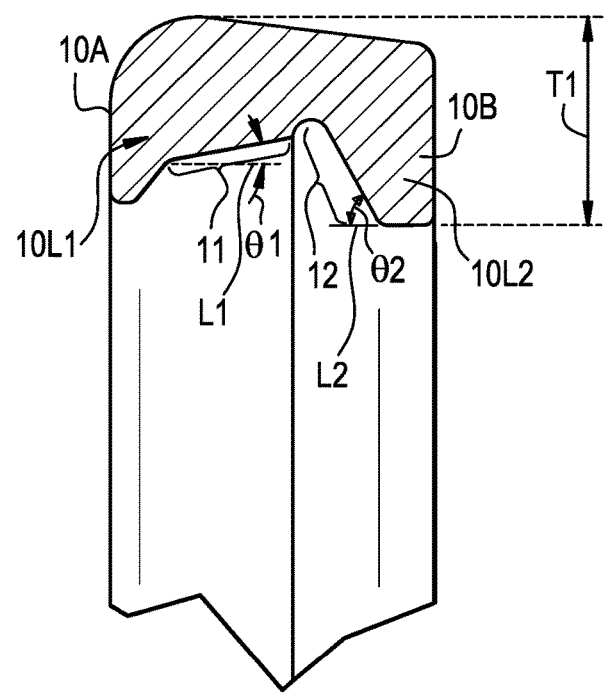
FIG. 3D is a partial side sectional view of the seal ring of FIG. 3C within detail D.
Figure 3E:
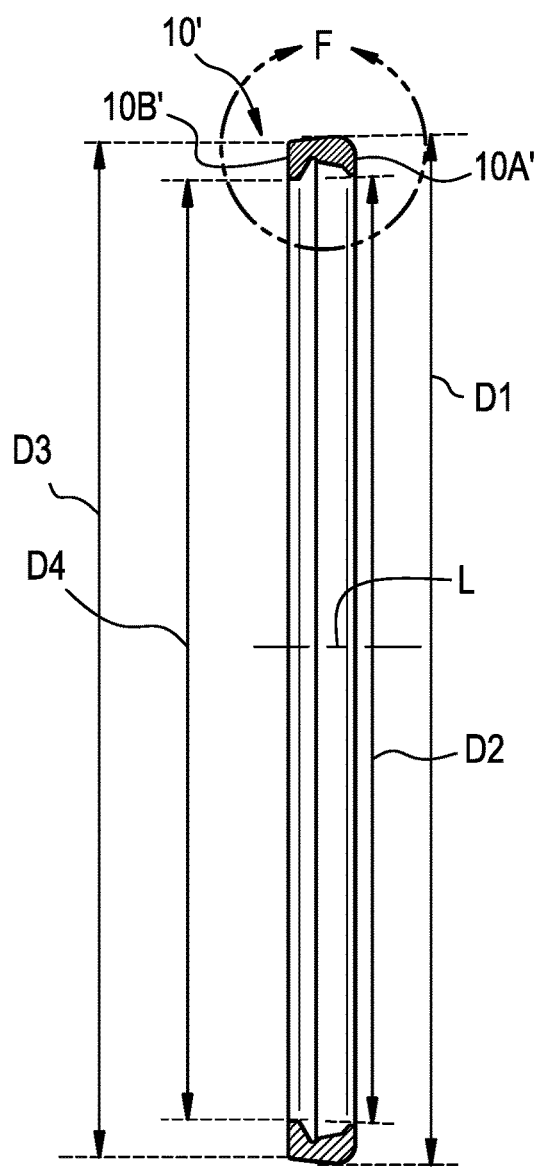
FIG. 3E is a side sectional view of a seal ring compatible with the flexible alignment sealing coupling of FIG. 1.
Figure 3F:
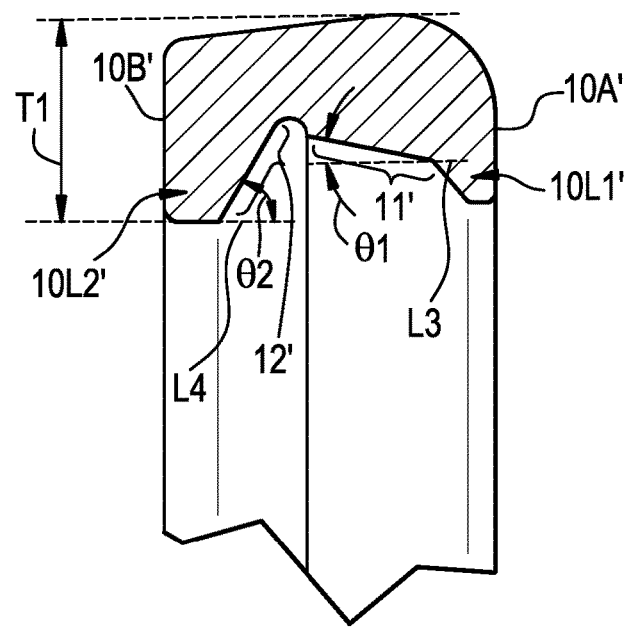
FIG. 3F is a partial side sectional view of the seal ring of FIG. 3E within detail F.

Referring to FIGS. 3D and 3F, the first section 11, 11' is sloped radially outward relative to the first axial end 10, 10A' of the first and second seals 10, 10' and the second section 12, 12' is sloped radially outward relative to the second axial end 10B, 10B' of the first and second seals 10, 10'. Each of the first seal taper angle θ1 and the second seal taper angle θ2 is greater than zero degrees and less than 90 degrees. For example, in the embodiment depicted in FIGS. 3B, 3C, 3D, 3E, and 3F, the first seal taper angle θ1 is about 10 degrees and the second seal taper angle θ2 is about 60 degrees. As shown in FIG. 3B, the second lobe 10L2, 10L2' extends radially inward a distance R3. The distance R3 is about 45 percent to about 55 percent of the total radial thickness R1 of the annular member.

Referring to FIGS. 3C and 3E, the first axial end 10A, 10A' of the first and second seals 10, 10' has a first outside diameter D1 and a first inside diameter D2 defining an annulus with a first cross sectional area that is perpendicular to the longitudinal axis L. The second axial end 10B, 10B' of the first and second seals 10, 10' has a second outside diameter D3 and a second inside diameter D4 defining an annulus with a second cross sectional area that is perpendicular to the longitudinal axis L. The first cross sectional area is about 105 percent to about 115 percent of the second cross sectional area. The annular member has a maximum outside diameter at the first outside diameter D1 and a minimum inside diameter at the second inside diameter D4. A radial thickness T1 (shown in FIGS. 3D and 3F) is defined by the maximum outside diameter at the first outside diameter D1 and the minimum inside diameter at the second inside diameter D4 according to the equation $T1=(D1-D4)/2$.

Figure 5:
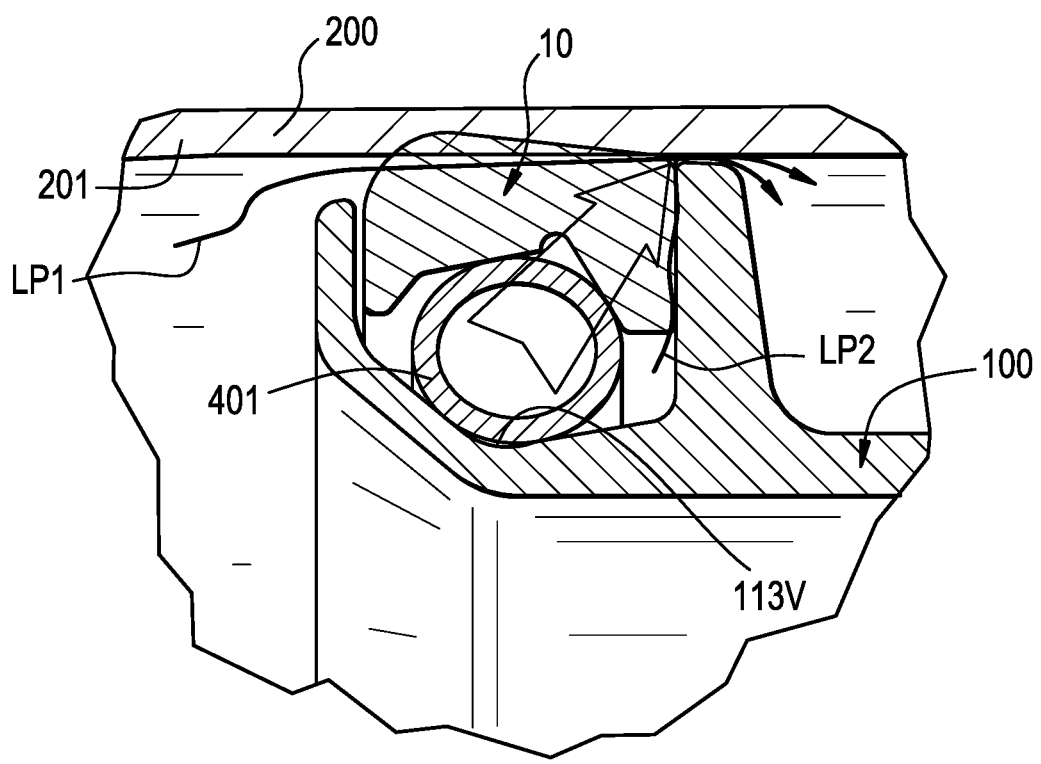
FIG. 5 is a partial side sectional view of a sleeve, a seal ring, a spring, and a ring holder of the flexible alignment sealing coupling of FIG. 1 depicting a leakage path and a spring force distribution.
Figure 6:
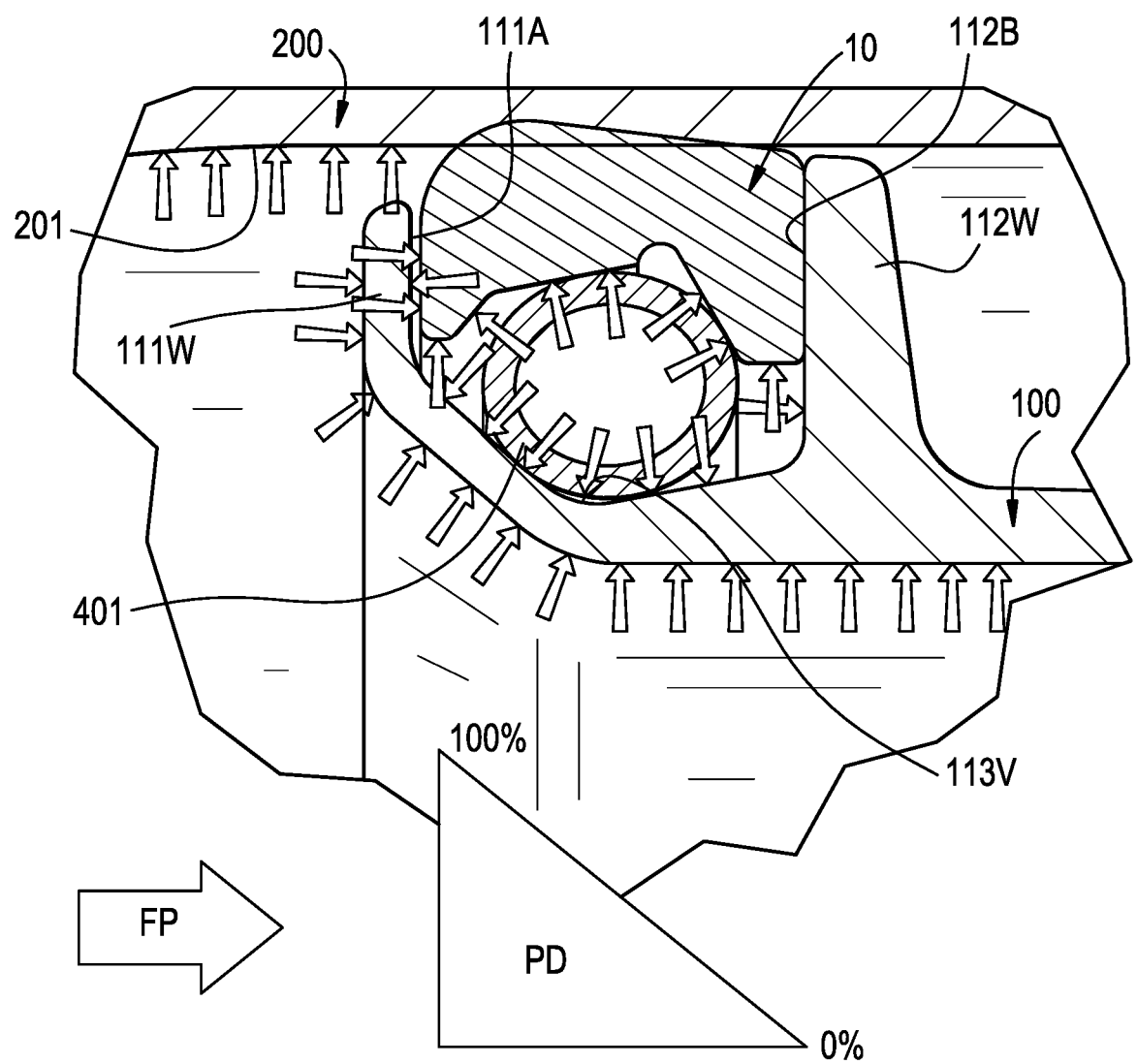
FIG. 6 is a partial side sectional view of a sleeve, a seal ring, a spring and a ring holder of the flexible alignment sealing coupling of FIG. 1 depicting the pressure distribution throughout the coupling and seal ring.

Referring to FIGS. 5 and 6, the V-shaped surface 113V of the ring holder 100 causes the first biasing member 401 to impart a force on the first seal 10 that reacts against the first inner sealing surface 201. The force has a direction that has about a 60 percent radial component and about a 40 percent axial component. The first sleeve 200 and the second sleeve 300 each have an inward conical taper 203, 303 configured to reduce pressure losses through the flexible alignment coupling 1000 (as depicted in detail in FIG. 1).

Figure 3G:
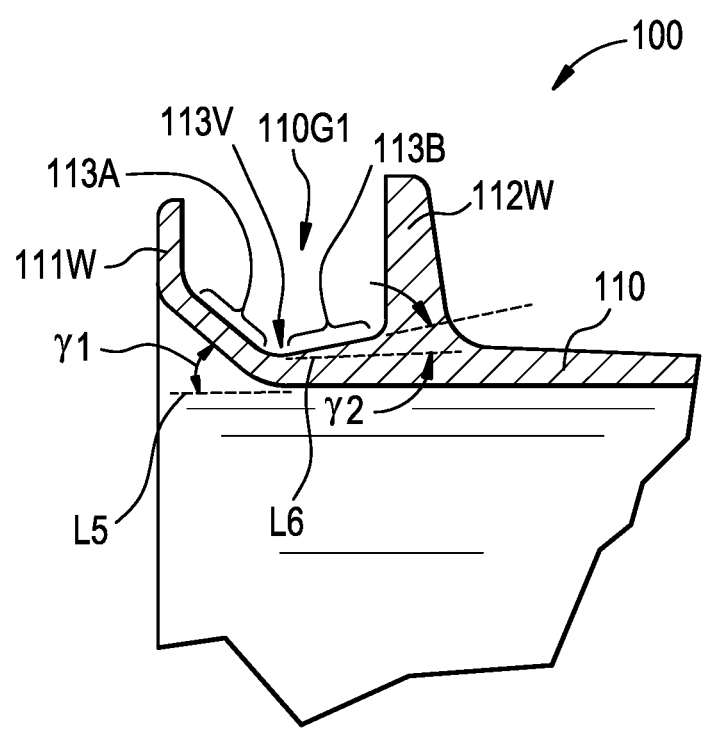
FIG. 3G is a partial side sectional view of a ring holder compatible with the flexible alignment sealing coupling of FIG. 1.
Figure 7A:
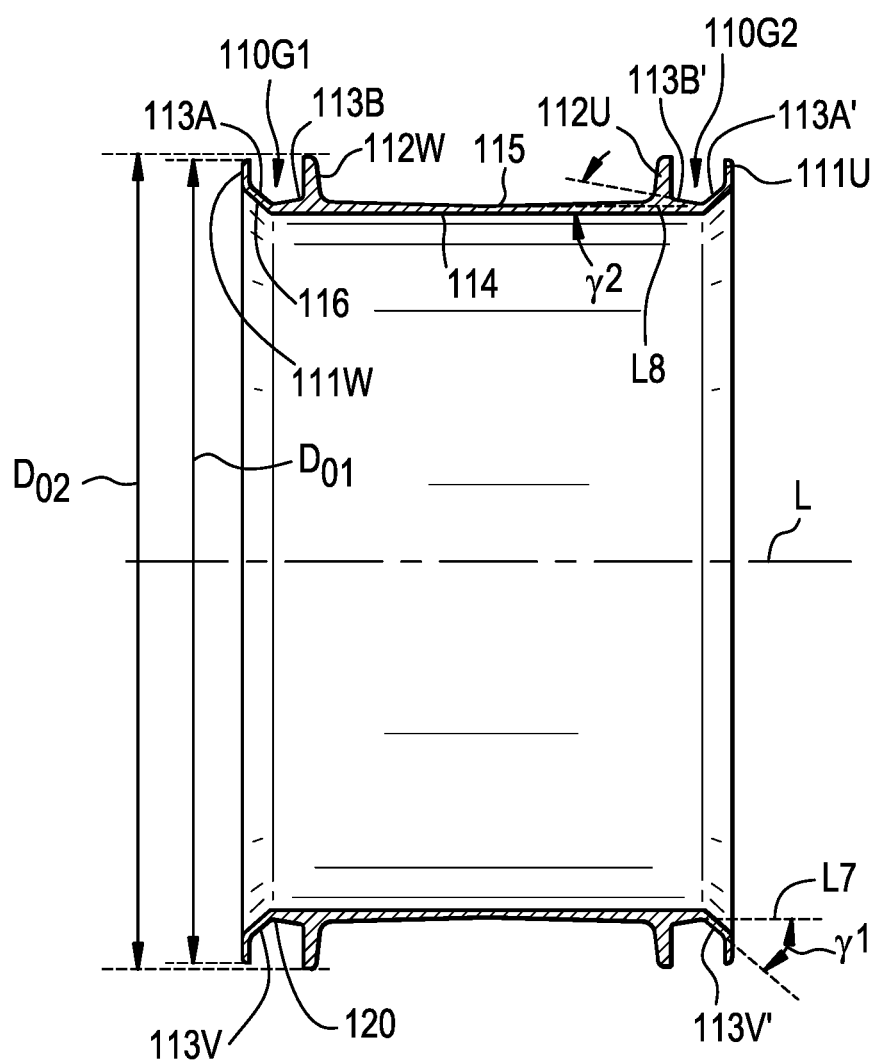
FIG. 7A is a side sectional view of a ring holder compatible with the flexible alignment sealing coupling of FIG. 1.

Referring to FIGS. 3G and 7A, the ring holder 100 for a flexible alignment sealing coupling 1000 includes a tubular body 110. The tubular body 110 is symmetrical about the longitudinal axis L and has the first radially outward opening first groove 110G1 formed thereon. The first groove 110G1 (depicted in detail in FIG. 3G) has an outboard wall 111W and the inboard wall 112W, each extending circumferentially around the tubular body 110. The concave asymmetrical V-shaped surface 113V of the first groove 110G extends between the outboard wall 111W and the inboard wall 112W. The V-shaped surface 113V is defined by a first groove-segment 113A sloped at an outboard taper angle γ1, measured relative to a fifth line L5 that is parallel to the longitudinal axis L, and a second groove-segment 113B sloped at an inboard taper angle γ2, measured relative to a sixth line L6 that is parallel to the longitudinal axis L. In the embodiment depicted in FIG. 3G the outboard taper angle γ1 is about 40 degrees and the inboard taper angle γ2 is about 10 degrees.

Referring to FIG. 7A, the outboard wall 111W has a first outside diameter $D_{O1}$ and the inboard wall 112W has a second outside diameter $D_{O2}$ that is greater than the first outside diameter $D_{O1}$. The second outside diameter $D_{O2}$ is about 108 percent to about 112 percent of the first outside diameter $D_{O1}$. The tubular body 110 has a body interior surface 114 that has a chamfer 116 formed opposite the first groove-segment 113A. The chamfer 116 is parallel to the first groove-segment 113A.

Referring to FIG. 7A, the ring holder 100 has the radially outward facing second groove 110G2 formed thereon. A cylindrical tube segment 115 extends between the first groove 110G1 and the second groove 110G2. The second groove 110G2 has an outboard wall 111U and an inboard wall 112U, each extending circumferentially around the tubular body 110. The second groove 110G2 has a concave asymmetrical V-shaped surface 113V' extending between the outboard wall 111U and the inboard wall 112U. The V-shaped surface 113V' is defined by a first groove-segment 113A' sloped at the outboard taper angle γ1, measured relative to a seventh line L7 that is parallel to the longitudinal axis L, and a second groove-segment 113B' sloped at the inboard taper angle γ2, measured relative to an eighth line L8 that is parallel to the longitudinal axis L.

Figure 7B:
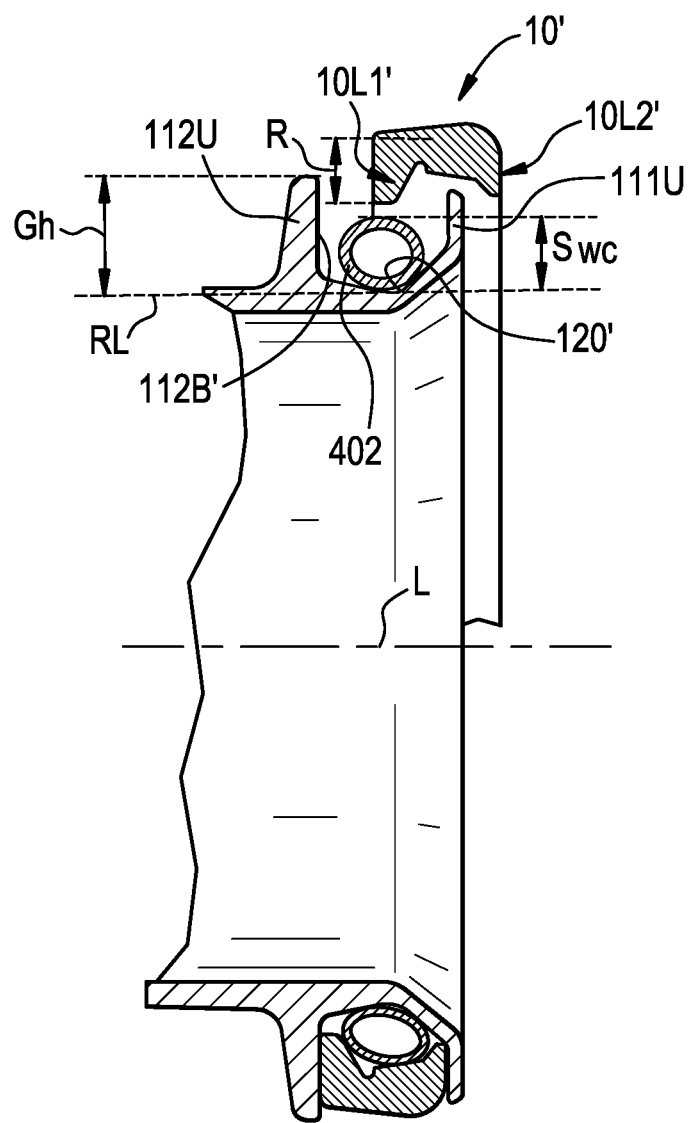
FIG. 7B is a partial side sectional view of a seal ring, a spring and a ring holder compatible with the flexible alignment sealing coupling of FIG. 1 depicting a seal ring installation technique.

Referring to FIG. 7B, the first groove-segment 113A' and the second groove-segment 113B' of the radially outward facing second groove 110G2 intersect at a valley 120'. The inboard wall 112U extends a first distance Gh, radially outward relative to a reference line RL, that intersects the valley 120' and is parallel to the longitudinal axis L. The first lobe 10L1' of the second seal 10' has an edge radial thickness R. The first distance Gh is greater than or equal to 1.6 times the edge radial thickness R. The edge radial thickness R is less than a first height Swc of the second biasing member 402, when the second biasing member 402 is compressed in the V-shaped surface 113V' to about 80 percent to about 85 percent of a free state height of the biasing member 402. The second groove 110G2 has matching features to the first groove 110G1 but flipped over an axis perpendicular to the longitudinal axis L (i.e. the second groove 110G2 is a mirrored copy of the first groove 110G1), as shown in FIGS. 1, 2, and 7A. Thus, the descriptions herein regarding the first groove 110G1 shown in FIG. 3G is equally applicable to the second groove 110G2, and the descriptions herein regarding the second groove 110G2 shown in FIG. 7B is equally applicable to the first groove 110G1.

Referring to FIG. 6, the first seal 10 is dynamically actuated by system pressure as fluid flows from the first sleeve 200, through the ring holder 100, to the second sleeve 300, as depicted by the flow path arrow FP at the bottom of FIG. 6. Fluid flows between a backside 111A of the outboard wall 111W and the first inner sealing surface 201 and the fluid pressure urges the first seal 10 against the first inner sealing surface 201 of the first sleeve 200 and a front operating surface 112B of the inboard wall 112W. The biasing member 401 provides a static actuation force urging the first seal 10 against the first inner sealing surface 201 of the first sleeve 200. In dynamic mode, this secondary actuation of the first seal 10 provided by the biasing member 401 contributes to the actuation of the first seal 10 caused by the system pressure. The biasing member 401 also provides seal resistance to system loads when there is no system pressure, at low pressure or in idling mode. The pressure generated by the fluid loads the inner surfaces of the first sleeve 200, the ring holder 100 and the first seal 10 in the radially outward direction and loads the first groove 110G1 in the radially inward direction, as depicted by the unlabeled arrows in FIG. 6. The pressure distribution along the flow path FP is depicted as the triangle PD at the bottom of FIG. 6. In the embodiment depicted in FIG. 6, about 85 percent of the load generated by the fluid pressure is onto the V-shaped surface 113V (specifically acting on the first groove-segment 113A and the second groove-segment 113B, as depicted in FIG. 7A) and about 15 percent of the load generated by the fluid pressure is onto the backside 111A of the outboard wall 111W. In dynamic mode when the system is pressurized, the seals 10, 10' actuate predominantly outward with about 75 percent of the expansion on the first section 11, 11' and about 25 percent on the second section 12, 12'. This pressure load closes the leak path gaps LP1, LP2 depicted in FIG. 5, by compressing the first seal 10 radially outward against the first sleeve 200 and axially against the inboard wall 112W. Simultaneous actuation of the first seal 10 by the biasing member 401 and by the system pressure provides low leakage between the ring holder 100 and the first sleeve 200, with a leakage rate of approximately 0.001 Lb/Minute per inch of diameter (at room temperature where the diameter is the nominal size of the connecting-joining ducts in the system, i.e., the nominal inside diameter of the first sleeve 200). This leakage rate improves at operating conditions in which the temperatures and pressures are elevated, causing the material (e.g., thermal plastic material) of the first seal 10 to soften. The increased elasticity of the first seal 10 at higher temperatures results in a leakage rate of approximately 0.0005 Lb/Minute per inch of diameter.

Referring to FIGS. 1 and 2, the first sleeve 200 is secured to a first conduit 500 and the second sleeve 300 is secured to a second conduit 600. As depicted in FIG. 2, there are two axial travel adjustment coefficients Ce, Cc. Ce is the extension axial travel adjustment coefficient and Cc is the compression axial travel adjustment coefficient. Ae is the coupling total extension. Ac is the coupling total compression. The total length S of the sleeves 200, 300 is represented by the following equation:

$$S = Ce + Cc$$

During symmetrical articulation:

$$C = Ce + Cc = 1, Ce = Cc = 0.5$$

During asymmetrical articulation (more in an Extension Mode):

$$Ce > 0.5 \text{ for } Ae > Ac$$

During asymmetrical articulation (more in a Contraction Mode):

$$Cc > 0.5 \text{ for } Ac > Ae$$

During nominal symmetrical articulations of the coupling (α=0°), the maximum axial travel Amax is expressed with reference to the total length S of the sleeves 200, 300 and the width W of the ring holder 100 by the following equations:

$$A\max = \pm 2 \cdot (S - W)$$

$$C = 1, Ce = Cc = 0.5$$

$$Ae = Ac$$

The coupling offset=0 at α=0°.

During asymmetrical coupling articulations (α=0°), the coupling total extension Ae (with reference to extension adjustment coefficient Ce) and the coupling total compression Ac (with reference to compression adjustment coefficient Cc) is expressed by the following equations:

$$Ae=2\cdot[Ce(S-W)]$$

$$Ce>0.5$$

$$Ac=2\cdot[Cc(S-W)]$$

$$Cc<0.5$$

The coupling offset=0 at α=0°.

During asymmetrical coupling articulations of α° for bigger extensions, Ae and Ac are expressed by the following equations:

$$Ae=2\cdot[Ce(S-W-T_D)]\text{(total extension at)}\alpha°$$

$$Ce>0.5$$

$$Ac=2\cdot[Cc(S-W-T_D)]\text{(total compression at)}\alpha°$$

$$Cc<0.5$$

$T_D$ is the tangent at angle α, which is expressed by the following equation (with reference to the internal diameter D of the sleeves 200, 300):

$$T_D=D/2\cdot tg\alpha$$

The coupling offset Of is represented by the following equation (with reference to Lrh defined as the ring holder length between pivot points PV1, PV2 when each end of the coupling angulates α°)

$$Of=Lrh\cdot tg\alpha$$

During asymmetrical coupling articulations of α° for bigger compressions (each end of the coupling angulates)α°, Ae, Ac and $T_D$ are expressed by the following equations:

$$Ae=2\cdot[Ce(S-W-T_D)]$$

$$Ce<0.5$$

$$Ac=2\cdot[Cc(S-W-T_D)]$$

$$Cc>0.5$$

$$T_D=D/2\cdot tg\alpha$$

$$Of=Lrh\cdot tg\alpha$$

Referring to FIG. 7B, in order to properly seat the second seal 10' in the second ring groove 110G2, a user must first install the second biasing member 402 in the second groove 110G2 of the ring holder 100. The second seal 10' has the first lobe 10L1' oriented toward the front operating surface 112B' of the second groove 110G2. In order to install the second seal 10' in the second groove 110G2, the minimum internal diameter proximate the second axial end 10B' of the second seal 10' radially expands to pass over the second biasing member 402 and sits on the front operating surface 112B' of the second holder groove 110G2. Installation of the second seal 10' starts at one side and works around the second groove 110G2 (i.e. the second seal 10' radially expands at a circumferentially rotating position). The second seal 10' becomes elliptical in shape and extends beyond or equalizes with the first outside diameter $D_{O1}$ of the outboard wall 111U. The second biasing member 402 is trapped by the first lobe 10L1' while being pushed toward the backside 111A' of the second groove 110G2. The second biasing member 402 remains behind the first lobe 10L1' and along the backside 111A' of the second groove 110G2. The second seal 10' continues to be worked around until the second seal 10' snaps into the second groove 110G2.

Figure 4:
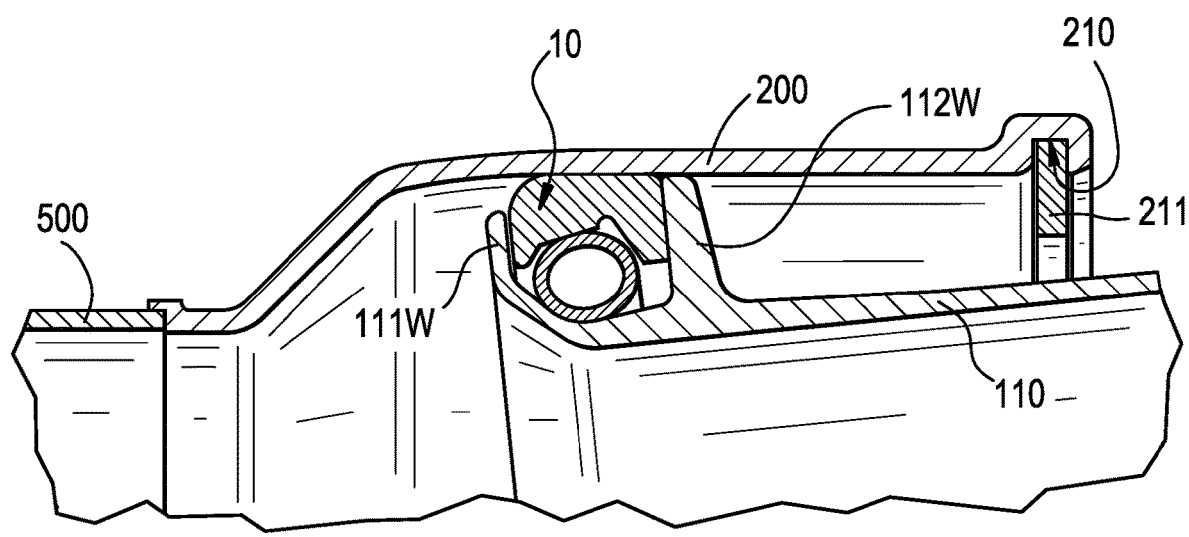
FIG. 4 is a partial side sectional view of a sleeve, a seal ring, a spring, and a ring holder of the flexible alignment sealing coupling of FIG. 1.

Referring to FIG. 4, the first outside diameter $D_{O1}$ of the outboard wall 111W is less than the second outside diameter $D_{O2}$ of the inboard wall 112W. This allows for easier installation of the first seal 10 in the first groove 110G1 of the ring holder 100, as outlined above with reference to the installation of the second seal 10' in the second groove 110G2 of the ring holder 100.

The flexible alignment seal coupling 1000 is made from materials, including but not limited to: stainless steels, titanium alloys, Inconel alloys or aluminum alloys which allows joining by welding with any ducting material combination. The flexible alignment seal coupling 1000 disclosed herein is compatible with Standard AS V-Band flanges, custom flanges or other structures that integrate with existing system configurations and may be utilized in forming joining techniques.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A seal for a flexible alignment sealing coupling, the seal comprising:
   an annular member being symmetric about a longitudinal axis, the annular member having a radially inward facing surface extending an axial width between a first axial end and a second axial end thereof, in a relaxed state of the seal the radially inward facing surface having an asymmetric generally concave V-shaped cross section and defined by a first section and a second section, the first section has a first seal taper angle measured relative to a first line parallel to the longitudinal axis and the second section has a second seal taper angle measured relative to a second line parallel to the longitudinal axis, wherein the first taper angle is less than the second taper angle, wherein each of the first taper angle and the second taper angle is greater than zero degrees and less than 90 degrees, the annular member having an undercut groove in the concave V-shaped cross section.

2. The seal of claim 1, wherein the first section is sloped from a first point to a second point that is radially outward of and axially inward from the first point and the second section is sloped from a third point to a fourth point that is radially outward of and axially inward from the third point, wherein the second point and the fourth point are located axially between the first point and the third point.

3. The seal of claim 1, wherein the first seal taper angle is about 10 degrees.

4. The seal of claim 1, wherein the second seal taper angle is about 60 degrees.

5. The seal of claim 1, wherein the undercut groove is located at a juncture of the first section and the second section and being positioned a distance of about 55 percent to about 65 percent of the axial width of the annular member, measured from the first axial end.

6. The seal of claim 1, wherein the undercut groove is located at a juncture of the first section and the second section and being positioned a distance of about 45 percent to about 55 percent of a radial thickness of the annular member, measured from an outermost portion of an exterior surface of the annular member to a radially innermost surface of the annular member.

7. The seal of claim 1, further comprising:
a first lobe located between the first axial end and the undercut groove, the first lobe extending radially inward from the first section; and
a second lobe located between the second axial end and the undercut groove, the second lobe extending radially inward from the second section.

8. The seal of claim 7, wherein the second lobe extends radially inward a distance which is about 45 percent to about 55 percent of an overall radial thickness of the annular member.

9. The seal of claim 1, wherein the annular member has a maximum outside diameter at a first outside diameter, a minimum inside diameter at a second inside diameter and a radial thickness defined by the maximum outside diameter and the minimum inside diameter.

10. The seal of claim 1, wherein the annular member is a circumferentially continuous ring that is configured to expand radially and axially.

11. A seal for a flexible alignment sealing coupling, the seal comprising:
an annular member being symmetric about a longitudinal axis, the annular member having a radially inward facing surface extending an axial width between a first axial end and a second axial end thereof, in a relaxed state of the seal the radially inward facing surface having an asymmetric generally concave V-shaped cross section and defined by a first section and a second section, the first section has a first seal taper angle measured relative to a first line parallel to the longitudinal axis and the second section has a second seal taper angle measured relative to a second line parallel to the longitudinal axis, wherein the first taper angle is less than the second taper angle, wherein each of the first taper angle and the second taper angle is greater than zero degrees and less than 90 degrees;
a first lobe located between the first axial end and the undercut groove, the first lobe extending radially inward from the first section; and
a second lobe located between the second axial end and the undercut groove, the second lobe extending radially inward from the second section,
wherein the second lobe extends radially inward to a greater extent than does the first lobe.

12. A seal for a flexible alignment sealing coupling, the seal comprising:
an annular member being symmetric about a longitudinal axis, the annular member having a radially inward facing surface extending an axial width between a first axial end and a second axial end thereof, in a relaxed state of the seal the radially inward facing surface having an asymmetric generally concave V-shaped cross section and defined by a first section and a second section, the first section has a first seal taper angle measured relative to a first line parallel to the longitudinal axis and the second section has a second seal taper angle measured relative to a second line parallel to the longitudinal axis, wherein the first taper angle is less than the second taper angle, wherein each of the first taper angle and the second taper angle is greater than zero degrees and less than 90 degrees, and
wherein the first axial end of the annular member has a first outside diameter and a first inside diameter defining an annulus with a first cross sectional area perpendicular to the longitudinal axis, the second axial end of the annular member has a second outside diameter and a second inside diameter defining an annulus with a second cross sectional area perpendicular to the longitudinal axis, and the first cross sectional area is 105 percent to 115 percent of the second cross sectional area.

13. A ring holder for a flexible alignment sealing coupling, the ring holder comprising:
a tubular body being symmetrical about a longitudinal axis and having a radially outward opening first groove formed thereon, the first groove having a first outboard wall with a backside, a first inboard wall with a front side, and a concave asymmetrical first V-shaped surface, the first V-shaped surface being defined by a first groove-segment that extends from the front side and is sloped at a first outboard taper angle measured relative to a first line parallel to the longitudinal axis and a second groove-segment that extends from the backside and is sloped at a first inboard taper angle measured relative to a second line parallel to the longitudinal axis.

14. The ring holder of claim 13, wherein the first outboard taper angle is about 40 degrees.

15. The ring holder of claim 13, wherein the first inboard taper angle is about 10 degrees.

16. The ring holder of claim 13, wherein the first outboard wall has a first outside diameter and the first inboard wall has a second outside diameter that is greater than the first outside diameter.

17. The ring holder of claim 13, wherein the tubular body has a body interior surface that has a chamfer formed opposite the first groove-segment.

18. The ring holder of claim 13, wherein the first V-shaped surface is configured to cause a biasing member seated therein to impart a force on a seal disposed in the first groove, the force having a direction that is comprised of about a 60 percent radial component and about a 40 percent axial component.

19. The ring holder of claim 18, wherein the seal comprises an annular member being symmetric about the longitudinal axis, the annular member having a radially inward facing surface extending an axial width between a first axial end and a second axial end thereof, in a relaxed state of the seal the radially inward facing surface having an asymmetric generally concave V-shaped cross section and defined by a first section and a second section, the first section has a first seal taper angle measured relative to a third line parallel to the longitudinal axis and the second section has a second seal taper angle measured relative to a fourth line parallel to the longitudinal axis, wherein the first taper angle is less than the second taper angle, wherein each of the first taper angle and the second taper angle is greater than zero degrees and less than 90 degrees.

20. A ring holder for a flexible alignment sealing coupling, the ring holder comprising:
a tubular body being symmetrical about a longitudinal axis and having a radially outward opening first groove formed thereon, the first groove having a first outboard wall and a first inboard wall each extending circumferentially around the tubular body and a concave asymmetrical first V-shaped surface extending between the first outboard wall and the first inboard wall, the first V-shaped surface being defined by a first groove-segment sloped at a first outboard taper angle measured relative to a first line parallel to the longitudinal axis and a second groove-segment sloped at a first inboard taper angle measured relative to a second line parallel to the longitudinal axis, wherein the first outboard wall has a first outside diameter and the first inboard wall has a second outside diameter that is greater than the first outside diameter, and wherein the second outside diameter is 108 percent to 112 percent of the first outside diameter.

21. A ring holder for a flexible alignment sealing coupling, the ring holder comprising:
a tubular body being symmetrical about a longitudinal axis and having a radially outward opening first groove formed thereon, the first groove having a first outboard wall and a first inboard wall each extending circumferentially around the tubular body and a concave asymmetrical first V-shaped surface extending between the first outboard wall and the first inboard wall, the first V-shaped surface being defined by a first groove-segment sloped at a first outboard taper angle measured relative to a first line parallel to the longitudinal axis and a second groove-segment sloped at a first inboard taper angle measured relative to a second line parallel to the longitudinal axis, wherein the tubular body has a body interior surface that has a chamfer formed opposite the first groove-segment, and wherein the chamfer is parallel to the first groove-segment.

22. A ring holder for a flexible alignment sealing coupling, the ring holder comprising:
a tubular body being symmetrical about a longitudinal axis and having a radially outward opening first groove formed thereon, the first groove having a first outboard wall and a first inboard wall each extending circumferentially around the tubular body and a concave asymmetrical first V-shaped surface extending between the first outboard wall and the first inboard wall, the first V-shaped surface being defined by a first groove-segment sloped at a first outboard taper angle measured relative to a first line parallel to the longitudinal axis and a second groove-segment sloped at a first inboard taper angle measured relative to a second line parallel to the longitudinal axis; and
a radially outward facing second groove formed thereon, the second groove having a second outboard wall and a second inboard wall each extending circumferentially around the tubular body and a concave asymmetrical second V-shaped surface extending between the second outboard wall and the second inboard wall, the second V-shaped surface being defined by a third groove-segment sloped at a second outboard taper angle measured relative to a third line parallel to the longitudinal axis and a fourth groove-segment sloped at a second inboard taper angle measured relative to a fourth line parallel to the longitudinal axis.

23. The ring holder of claim 22, further comprising a cylindrical tube segment extending between the first groove and the second groove.

24. A flexible alignment sealing coupling comprising:
a first sleeve having a first inner sealing surface extending circumferentially therein;
a radially outward opening first groove of a ring holder being disposed inside the first sleeve, the ring holder comprising a tubular body being symmetrical about a longitudinal axis and having the radially outward opening first groove formed thereon, the first groove having a first outboard wall and a first inboard wall each extending circumferentially around the tubular body and a concave asymmetrical first V-shaped surface extending between the first outboard wall and the first inboard wall, the first V-shaped surface being defined by a first groove-segment sloped at a first outboard taper angle measured relative to a first line parallel to the longitudinal axis and a second groove-segment sloped at a first inboard taper angle measured relative to a second line parallel to the longitudinal axis;
a first biasing member disposed in the first groove and seated on the first V-shaped surface;
a first seal disposed in the first groove, the first seal comprising a first annular member being symmetric about the longitudinal axis, the first annular member having a first radially inward facing surface extending a first axial width between a first axial end and a second axial end thereof, in a relaxed state of the first seal the first radially inward facing surface having an asymmetric generally concave V-shaped cross section and defined by a first section and a second section, the first section has a first seal taper angle measured relative to a third line parallel to the longitudinal axis and the second section has a second seal taper angle measured relative to a fourth line parallel to the longitudinal axis, wherein the first taper angle is less than the second taper angle, wherein each of the first taper angle and the second taper angle is greater than zero degrees and less than 90 degrees, the first seal being disposed in the first groove such that the first radially inward facing surface of the first seal being seated on the first biasing member and an exterior surface of the first seal being in sliding sealing engagement with the first inner sealing surface of the first sleeve.

25. The flexible alignment coupling of claim 24, further comprising:
a second sleeve having a second inner sealing surface extending circumferentially therein;
a radially outward opening second groove of the ring holder being disposed inside the second sleeve, the second groove having a second outboard wall and a second inboard wall each extending circumferentially around the tubular body and a concave asymmetrical second V-shaped surface extending between the second outboard wall and the second inboard wall, the second V-shaped surface being defined by a third groove-segment sloped at a second outboard taper angle measured relative to a fifth line parallel to the longitudinal axis and a fourth groove-segment sloped at a second inboard taper angle measured relative to a sixth line parallel to the longitudinal axis;
a second biasing member disposed in the second groove and seated on the second V-shaped surface;
a second seal disposed in the second groove, the second seal comprising a second annular member being symmetric about the longitudinal axis, the second annular member having a second radially inward facing surface extending a second axial width between a first axial end and a second axial end thereof, in a relaxed state of the second seal the second radially inward facing surface having an asymmetric generally concave V-shaped cross section and defined by a third section and a fourth section, the third section has a third seal taper angle measured relative to a seventh line parallel to the longitudinal axis and the fourth section has a fourth seal taper angle measured relative to an eighth line parallel to the longitudinal axis, wherein the third taper angle is less than the fourth taper angle, wherein each of the third taper angle and the fourth taper angle is greater than zero degrees and less than 90 degrees, the second seal being disposed in the second groove such that the second radially inward facing surface of the second seal being seated on the second biasing member and an exterior surface of the second seal being in sliding sealing engagement with the second inner sealing surface of the second sleeve; and wherein the first sleeve and the second sleeve are configured for axial, conical and radial movement relative to each other.

26. The flexible alignment coupling of claim 25, wherein the first V-shaped surface of the ring holder causes the first biasing member to impart a first force on the first seal that reacts against the first inner sealing surface, the first force having a direction that is comprised of about a 60 percent radial component and about a 40 percent axial component, and the second V-shaped surface of the ring holder causes the second biasing member to impart a second force on the second seal that reacts against the second inner sealing surface, the second force having a direction that is comprised of about a 60 percent radial component and about a 40 percent axial component.

27. The flexible alignment coupling of claim 26, wherein in a dynamic mode a fluid flowing through the first sleeve, the ring holder and the second sleeve has a fluid pressure acting on the first radially inward facing surface of the first seal, the second radially inward facing surface of the second seal, the first inner sealing surface of the first sleeve, the body interior surface of the tubular body, the second inner sealing surface of the second sleeve, the first V-shaped surface of the first groove, and the second V-shaped surface of the second groove.

28. The flexible alignment coupling of claim 27, wherein 85% of a force generated by the fluid pressure on the first groove and the second groove acts on the first V-shaped surface and the second V-shaped surface, and 15% of the force generated by the fluid pressure on the first groove and the second groove acts on a first backside of the first outboard wall and a second backside of the second outboard wall.

29. The flexible alignment coupling of claim 27, wherein 75% of a force generated by the fluid pressure on the first seal and the second seal acts on the first section of the first seal and the third section of the second seal, and 25% of the force generated by the fluid pressure on the first seal and the second seal acts on the second section of the first seal and the fourth section of the second seal.

30. The flexible alignment coupling of claim 25, wherein at least one of the first sleeve and the second sleeve has an inward conical taper configured to reduce pressure losses through the flexible alignment coupling.

31. The flexible alignment coupling of claim 25, wherein the first sleeve is secured to a first conduit and the second sleeve is secured to a second conduit, and wherein at least one of the first seal and the second seal are installable and removable in situ.

32. The flexible alignment coupling of claim 25, wherein the first sleeve has a first radially inward opening retaining groove extending circumferentially therearound and the second sleeve has a second radially inward opening retaining groove extending circumferentially therearound, wherein a first retaining ring is disposed in the first retaining groove and a second retaining ring is disposed in the second retaining groove.

33. The flexible alignment coupling of claim 25, wherein the third groove-segment and the fourth groove-segment intersect at a valley, the second inboard wall extending a first distance radially outward relative to a reference line that intersects the valley and is parallel to the longitudinal axis, the second seal having a lobe extending radially inward from the third section, the lobe having an edge radial thickness, and the first distance being greater than or equal to 1.6 times the edge radial thickness.

34. The flexible alignment coupling of claim 33, wherein the edge radial thickness is less than a first height of the second biasing member when the second biasing member is compressed in the second V-shaped surface to 80 to 85 percent of a free state height of the second biasing member.

35. The flexible alignment coupling of claim 24, the first seal further comprising a lobe extending radially inward from the second section, wherein the first seal is positioned in the first groove such that the lobe engages the first inboard wall.

* * * * *